(12) United States Patent
O'Dell et al.

(10) Patent No.: US 11,008,032 B2
(45) Date of Patent: May 18, 2021

(54) SAFETY RESTRAINT TRANSPORT CART

(71) Applicant: Safe Restraints, Inc., Walnut Creek, CA (US)

(72) Inventors: Ronald O'Dell, Danville, CA (US); Charles Hammond, Danville, CA (US)

(73) Assignee: SAFE RESTRAINTS, INC., Walnut Creek, CA (US)

( * ) Notice: Subject to any disclaimer, the term of this patent is extended or adjusted under 35 U.S.C. 154(b) by 106 days.

(21) Appl. No.: 16/598,773

(22) Filed: Oct. 10, 2019

(65) Prior Publication Data
US 2020/0039554 A1 Feb. 6, 2020

Related U.S. Application Data

(60) Provisional application No. 62/812,938, filed on Mar. 1, 2019.

(51) Int. Cl.
| | |
|---|---|
| *B62B 3/10* | (2006.01) |
| *B62B 5/06* | (2006.01) |
| *B62B 5/00* | (2006.01) |
| *B60R 22/18* | (2006.01) |
| *B60R 22/14* | (2006.01) |

(52) U.S. Cl.
CPC ............... *B62B 3/10* (2013.01); *B60R 22/14* (2013.01); *B60R 22/18* (2013.01); *B62B 5/00* (2013.01); *B62B 5/0009* (2013.01); *B62B 5/06* (2013.01); *B62B 2202/42* (2013.01)

(58) Field of Classification Search
CPC ........ B62B 7/004; B62B 7/04; B62B 2202/42
USPC ...................................... 280/640, 47.38, 47.4
See application file for complete search history.

(56) References Cited

U.S. PATENT DOCUMENTS

| | | | | |
|---|---|---|---|---|
| 3,860,254 A | * | 1/1975 | Wegener | B62B 1/208 280/652 |
| 3,907,323 A | * | 9/1975 | Knapp | B62B 5/04 280/47.3 |
| 4,697,835 A | * | 10/1987 | Scott | B62B 1/147 280/47.26 |
| 4,934,728 A | * | 6/1990 | Chen | B62B 7/06 280/47.4 |
| 4,986,563 A | * | 1/1991 | Grant | A61G 1/0212 280/47.11 |
| 5,125,674 A | * | 6/1992 | Manuszak | B62B 7/12 280/30 |
| 5,263,730 A | * | 11/1993 | Roach | B62B 7/04 280/47.4 |
| 5,328,192 A | * | 7/1994 | Thompson | B62B 1/208 280/43.1 |

(Continued)

*Primary Examiner* — Jeffrey J Restifo
(74) *Attorney, Agent, or Firm* — Gerald R. Prettyman

(57) ABSTRACT

Disclosed is a safety restraint and transport cart comprising a lower support frame, a mid-level support having left and right upper rails and a plurality of rear support rails, a handling system of wheels, brakes, a handle bar, and support rails, and a safety restraint net and net support system having a safety restraint net with a stain and tear-resistant net having a non-abrasive texture, a left and right net side affixments, a forward net affixment, a mid-frame net affixment, a rear next affixment, an upper net affixment, a front restraint for legs, a rear restraint for hands, and safety structure which avoids compression damage to the arms and hands of a restrained person.

20 Claims, 10 Drawing Sheets

(56) References Cited

U.S. PATENT DOCUMENTS

| | | | | |
|---|---|---|---|---|
| 5,330,212 A * | 7/1994 | Gardner | B62B 1/20 | |
| | | | 280/40 | |
| 5,492,196 A * | 2/1996 | Michno | A01M 31/02 | |
| | | | 182/187 | |
| 5,599,033 A * | 2/1997 | Kolbus | B62B 7/00 | |
| | | | 16/422 | |
| 5,620,193 A * | 4/1997 | Dschaak | B62B 1/22 | |
| | | | 280/47.31 | |
| 5,887,879 A * | 3/1999 | Chumley | B62B 1/125 | |
| | | | 280/40 | |
| 5,897,462 A * | 4/1999 | St. Germain | A61G 5/00 | |
| | | | 482/66 | |
| 6,056,306 A * | 5/2000 | Rust | B62B 7/06 | |
| | | | 280/204 | |
| 6,105,998 A * | 8/2000 | Baechler | B62B 7/062 | |
| | | | 280/47.38 | |
| 6,220,611 B1 * | 4/2001 | Shapiro | B62B 3/007 | |
| | | | 280/47.34 | |
| 6,341,787 B1 * | 1/2002 | Mason | B62B 1/18 | |
| | | | 280/47.26 | |
| 6,523,840 B1 * | 2/2003 | Koppes | B62B 3/144 | |
| | | | 280/33.991 | |
| 6,581,945 B1 * | 6/2003 | Shapiro | B62B 1/206 | |
| | | | 280/30 | |
| 6,607,200 B1 * | 8/2003 | Bridges | B62B 7/04 | |
| | | | 280/47.35 | |
| 6,942,228 B2 * | 9/2005 | Bunce | A01M 31/006 | |
| | | | 280/1.5 | |
| 7,090,242 B1 * | 8/2006 | Sheinall | A01K 1/0236 | |
| | | | 119/496 | |
| 7,114,742 B1 * | 10/2006 | Sterns | B25H 5/00 | |
| | | | 280/639 | |
| 7,490,684 B2 * | 2/2009 | Seymour | B60L 53/80 | |
| | | | 180/65.1 | |
| 7,510,208 B1 * | 3/2009 | Lochmueller | B62B 7/08 | |
| | | | 280/20 | |
| 7,878,515 B1 * | 2/2011 | Troup | B62B 7/10 | |
| | | | 280/47.38 | |
| 8,141,887 B1 * | 3/2012 | Poteat | B62B 1/12 | |
| | | | 280/47.24 | |
| 8,152,182 B2 * | 4/2012 | Vickers | B60N 2/2881 | |
| | | | 280/47.38 | |
| 8,657,304 B1 * | 2/2014 | Fredendall | B62B 3/144 | |
| | | | 280/33.993 | |
| 8,696,017 B2 * | 4/2014 | Wright | A61G 7/103 | |
| | | | 280/647 | |
| 8,757,646 B2 * | 6/2014 | Coleraine | B62B 7/08 | |
| | | | 280/47.4 | |
| 8,764,032 B1 * | 7/2014 | Dantice | B62B 3/14 | |
| | | | 280/47.35 | |
| 8,764,047 B2 * | 7/2014 | Daly | A61G 5/10 | |
| | | | 280/657 | |
| 8,770,615 B2 * | 7/2014 | Bar Noy | A61G 1/013 | |
| | | | 280/640 | |
| 8,857,829 B2 * | 10/2014 | Cheng | B62B 9/26 | |
| | | | 280/47.38 | |
| 8,955,855 B2 * | 2/2015 | Herlitz | B62B 9/14 | |
| | | | 280/47.38 | |
| 9,662,251 B2 * | 5/2017 | Fertig | A61G 5/1027 | |

* cited by examiner

SAFETY RESTRAINT TRANSPORT CART

CROSS-REFERENCE TO RELATED APPLICATION

This application claims the benefit of priority of U.S. Provisional Patent Application 62/812,938 filed Mar. 1, 2019 and titled "Transportation Cart for Restrained Persons," the disclosure of which is incorporated by reference.

STATEMENT REGARDING FEDERALLY SPONSORED RESEARCH OR DEVELOPMENT

Not Applicable

BACKGROUND OF THE INVENTION

Field of Invention

The invention relates generally to the field of the law enforcement activity and more specifically to the involuntary restraint and transportation of persons.

Description of Related Art

Law enforcement officers need at times to arrest or at least remove resistant or combatant persons. In many situations, law enforcement officers do not want to use potentially injurious projectiles. In those instances, officers may physically overcome the person, restrain the person, and then, due to space constraints prohibiting vehicular use, the officers drag or carry the person away from the scene. Even when vehicles are available, many vehicles lack a configuration safe for a resistive or combative person, and less so for including an officer to safely tend to a resistive or combative person. As a consequence, a resistant or combative person may suffer serious injury or death during transport.

SUMMARY OF THE INVENTION

Disclosed is a safety restraint transport cart for safely restraining and transporting people.

The safety restraint transport cart combines a transport cart with a secured tapered net which each work to safely restrain and confine a person for transport. The engineered parameters of the cart and of the net use the person's weight and position to enhance the stability of the cart, with additional safety-enhanced restraints that greatly decrease the injury or death risks otherwise inherent in restraining and transporting a resistant or combatant person.

The safety restraint transport cart includes a lower support frame which distributes a person's weight to aid stability, a mid-level support frame which provides safety-enhanced restraints that greatly decrease the injury or death risks, and supports a net provides additional safety-enhanced restraints that greatly decrease the injury or death risks, a safety restraint net and net support system which supports the net while distributing a person's weight in the net to aid stability, and providing for partial disassembly of the safety restraint transport cart for quick and easy transport of the cart to a needed situation, a handling system which provides for easy movement of the cart while minimizing injurious contact through light spaces, and a safety restraint system for assuring that a resistant or combatant person is safely restrained and confined for transport.

DETAILED DESCRIPTION OF THE INVENTION

Figure 1:
FIG. 1 is left front perspective view of a safety restraint transport cart and net with a person sitting within the net, legs extended, and feet restrained.

FIG. 1 is left front perspective view of a safety restraint transport cart (100) with a person sitting within the net, legs extended, and feet restrained.

The safety restraint transport cart (100) comprises a lower support frame (105), a mid-level support frame (200), a handling system (300), a safety restraint net and net support system (400), and a safety restraint system (500). As shown in FIG. 1, a person may be positioned onto a safety restraint net (405) and restrained with an at least one leg restraint structure (525), e.g. using cuffs, ties, etc., which can be secured at the front of the safely restraint transport cart (100).

Figure 2:
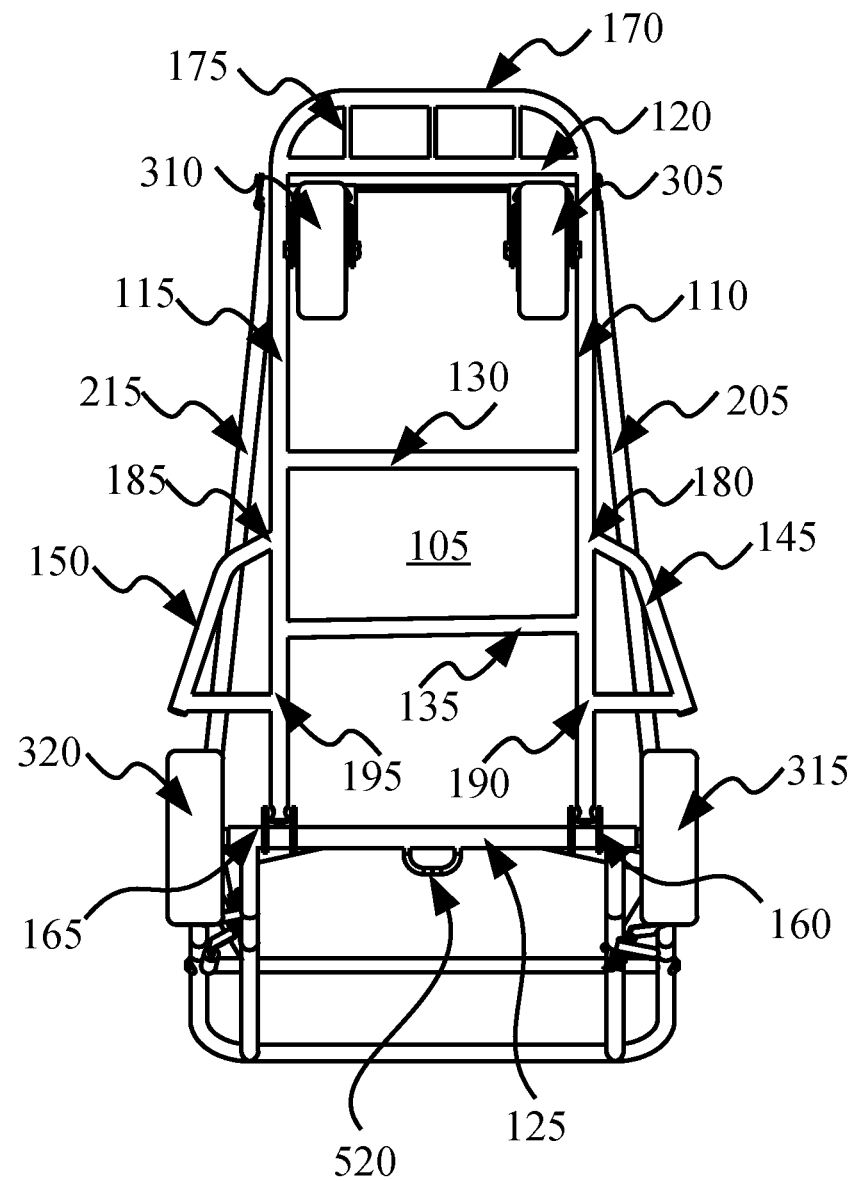
FIG. 2 is a bottom view of a safety restraint transport cart without a net showing the lower support frame.

FIG. 2 is a bottom view of a safety restraint transport cart without a net showing the lower support frame.

Shown in FIG. 2 arc portions of a lower support frame (105), portions of a mid-level support frame (200), portions of a handling system (300), and portions of a safety restraint system (500).

The portions of a lower support frame (105) shown in FIG. 2 include a lower support frame (105), a lower support frame first rail (110), a lower support frame second rail (115), a lower support frame front rail (120), a lower support frame back rail (125), a plurality of an at least one lower support frame mid-frame rail (130), an at least one lower support frame rear wheel deflection frame (145) for a first rear tire (315), an at least one lower support frame rear wheel second deflection frame (150) for a second rear tire (320), a left rear axle frame pivot (160), a right rear axle frame pivot (165), a front bumper (170), an at least one front bumper support rail (175), a lower support frame rear wheel first deflection frame front affixment (180), a lower support frame rear wheel second deflection frame front affixment (185), a lower support frame rear wheel first deflection frame rear affixment (190), a lower support frame rear wheel second deflection frame rear affixment (195), a first rear tire (315), a second rear tire (320), an at least one front restraint structure (515), and an at least one rear restraint structure (520).

The lower support frame (105) attaches and secure together the other structures of the safety restraint transport cart (100) for the safety restraint transport cart (100) to function as a restraining and transportation vehicle for restrained persons. The lower support frame (105) has five primary components, a lower support frame first rail (110), a lower support frame second rail (115), a lower support frame front rail (120), a lower support frame back rail (125), and an at least one lower support frame mid-frame rail (130).

In a basic configuration, the lower support frame (105) has a rectangular configuration of the lower support frame first rail (110), the lower support frame second rail (115), the lower support frame front rail (120), and the lower support frame back rail (125).

The lower support frame (105) comprises a lower support frame first rail (110) coupled at a front end to a first side of a lower support frame front rail (120), which is coupled at a second side to a front end of a lower support frame second rail (115), which is coupled at a back end to left side of a lower support frame back rail (125), which is coupled at a right side to the lower support frame first rail (110).

For restraining and transporting restrained persons, primarily adults or adult sized minors, the safety restraint transport cart (100) should provide restraining and transporting capacities for persons between 100 and 400 pounds. The safety restraint transport cart (100) could, however, be adapted for restraining and transporting other living creatures for which restraining and transporting are desired. The safety restraint transport cart (100) could also be adapted for restraining and transporting for materials in circumstances in which restraint against damage or loss during transport is desired.

The lower support frame (105) may be fabricated of any material capable of provide restraining and transporting capacities for persons between 100 and 400 pounds, other living creatures, or for materials in circumstances in which restraint against damage or loss during transport is desired. The lower support frame (105) may be fabricated of metal, including steel, aluminum, or other metals. The metal may be formed hollow such as pipe or tubing, solid, such as rod or various beam configurations. The lower support frame (105) may be fabricated of plastic for perhaps lesser capacity uses, or perhaps with reinforcing materials to assure the safety restraint transport cart (100) provides the necessary restraining and transporting capacities. The plastic may be ABS (Acrylonitrile Butadiene Styrene), Acetal (Polyoxymethylene, POM, Polycarbonate (PC), Polyvinyl Chloride (PVC), or other plastic with higher strength compared to other plastics. The lower support frame (105) may be fabricated of wood, or a composite material to provide the appropriate restraining and transporting capacity. The lower support frame (105) may be fabricated as one piece, as by molding, casting, sheet cutting, etc., or assembled from one or more pieces.

The lower support frame first rail (110) attaches and secures together the structures on the left side of the safety restraint transport cart (100). The lower support frame first rail (110) may be fabricated and made from any of the same materials and techniques as for the lower support frame (105) and should meet the same requirements so as to function as a restraining and transportation vehicle for restrained persons.

Attached at a front end of the lower support frame first rail (110) are the lower support frame from rail (120), the front bumper (170) and a first side upper rail (205). These structures are discussed below.

Attached at a rear end of the lower support frame first rail (110) is the lower support frame back rail (125), which is discussed below.

Attached along an inside edge, i.e., facing the lower support frame second rail (115), is an at least one lower support frame mid-frame rail (130), which is discussed below.

The lower support frame second rail (115) operates to attach and secure together the structures on the right side of the safety restraint transport cart (100). The lower support frame second rail (115) may be fabricated and made from any of the same materials and techniques as for the lower support frame (105) and should meet the same requirements so as to function as a restraining and transportation vehicle for restrained persons.

Attached at a front end of the lower support frame second rail (115) are the lower support frame front rail (120), the from bumper (170) and a second side upper rail (215). These structures are further discussed below.

Attached at a read end of the lower support frame second rail (115) is the lower support frame back rail (125), which is discussed below.

Attached along an inside edge, i.e., facing the lower support frame first rail (110), is an at least one lower support frame mid-frame rail (130), which is discussed below.

The lower support frame from rail (120) operates to attach and secure together the structures on the front of safety restraint transport cart (100). The lower support frame front rail (120) may be fabricated and made from any of the same materials and techniques as for the lower support frame (105) and should meet the same requirements so as to function as a restraining and transportation vehicle for restrained persons.

Attached at a left end of the lower support frame front rail (120) are the lower support frame second rail (115), the front bumper (170), and first side upper rail (205). The latter structures are discussed below.

Attached at a right end of the lower support frame front rail (120) are the lower support frame second rail (115), the front bumper (170), and second side upper rail (215). The latter structures are discussed below.

Attached along a front edge of the lower support frame front rail (120) are an at least one front bumper support rail (175) for coupling the lower support frame (105) to a front bumper (170).

The lower support frame back rail (125) operates to attach and secure together the structures at the rear of safety restraint transport cart (100). The lower support frame back rail (125) may be fabricated and made from any of the same materials and techniques as for the lower support frame (105) and should meet the same requirements so as to function as a restraining and transportation vehicle for restrained persons.

Attached to the lower support frame back rail (125), are the lower support frame first rail (110), the lower support frame second rail (115), a left rear axle frame pivot (160), a right rear axle frame pivot (165), a first rear tire (315), a second rear tire (320), and as will be discussed in other figures, an angularly coupled first side rear frame support rail (225), an angularly coupled second side rear frame support rail (230), an at least one handle bar support rail (345), and a handle bar second support rail (350).

The lower support frame back rail (125) also has an additional function. In being the attachment structure to the safety restraint transport cart (100) for the first rear tire (315)

and the second rear tire (320), the lower support frame back rail (125) also provides for rotation motion of the first rear tire (315) and the second rear tire (320).

As such, the lower support frame back rail (125) may be hollow and may comprise an at least one rear axle (155) comprising a first rear tire (315) and a second rear tire (320). The lower support frame back rail (125) may be hollow or hollow in part, and contain separate axles, one axle for the first rear tire (315) and one axle for the second rear tire (320) respectively.

An at least one lower support frame mid-frame rail (130) is coupled between the lower support frame first rail (110) and the lower support frame second rail (115). The at least one lower support frame mid-frame rail (130) provides lateral stabilization between the lower support frame first rail (110) and the lower support frame second rail (115), and support the net and restrained person within the safety restraint transport cart (100) by distributing the weight of a restrained person to the lower support frame first rail (110) and the lower support frame second rail (115).

The at least one lower support frame mid-frame rail (130) may also comprise a plurality of an at least one lower support frame mid-frame rail (130).

The at least one lower support frame mid-frame rail (130) may be fabricated and made from any of the same materials and techniques as for the lower support frame (105) and should meet the same requirements so as to function as a restraining and transportation vehicle for restrained persons.

The lower support frame (105) may also comprise an at least one lower support frame rear wheel deflection frame (145), for a first rear tire (315), a lower support frame rear wheel second deflection frame (150) for a second rear tire (320), or both an at least one lower support frame rear wheel deflection frame (145) and a lower support frame rear wheel second deflection frame (150).

An at least one lower support frame rear wheel deflection frame (145) is coupled to the lower support frame first rail (110) in front of a first rear tire (315). The at least one lower support frame rear wheel deflection frame (145) deflects small objects from in front of the rear wheels of the safety restraint transport cart (100) as the safety restraint transport cart (100) moves, and also warn an operator of the safety restraint transport cart (100) if a tire were to strike an obstacle, in the path of the first rear tire (315), or the second rear tire (320), such as a door jam, wall, or other object.

Figure 8:
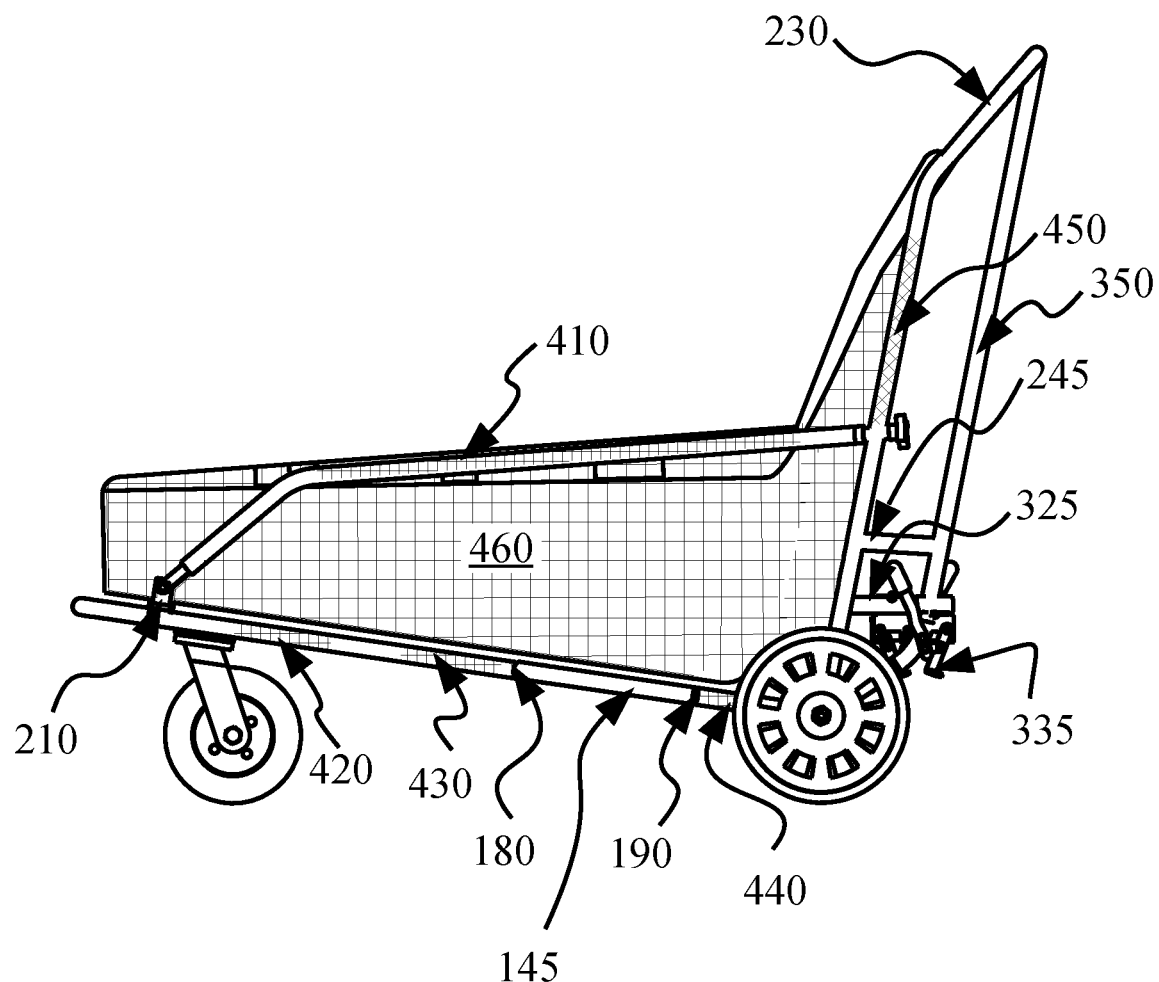
FIG. 8 is a left plan view of a safety restraint transport cart with a safety restraint net.

As shown in FIG. 8, die front bumper (170) extends a few inches in front of a safety restraint net (405) to provide a warning and cushion should the safety restraint transport cart (100) encounter an object in front of the safety restraint transport cart (100).

The lower support frame (105) also includes at least one front bumper support rail (175) to provide multiple functions. As a connecting portion between the lower support frame front rail (120) and the front bumper (170), the at least one front bumper support rail (175) extends the front bumper beyond the lower support frame front rail to decrease impact forces into the lower support frame (105). In addition, the smaller cross-section of the at least one front bumper support rail (175) provides a cushioning affect to protect the safety restraint transport cart (100) and a restrained person within the cart from objects contacting the front bumper.

In addition, as shown in FIG. 1, the at least one front bumper support rail (175) may be used as an at least one front restraint structure (515) with leg or ankle securing devices to secure a restrained person in the safety restraint transport cart (100).

As previously discussed, the lower support frame (105) may be fabricated from in any way from any material suitable for restraining and transporting capacities for persons between 100 and 400 pounds, other living creatures, or for materials in circumstances in which restraint against damage or loss during transport is desired.

As the safety restraint transport cart (100) will be used to transport restrained persons, the safety restraint transport cart (100) is likely to encounter shear forces both dependent upon and independent the restrained person, which can affect the stability of the safety restraint transport cart (100).

Attaching the at least one lower support frame rear wheel deflection frame (145) to the lower support frame (105) are a lower support frame rear wheel first deflection frame front affixment (180) and a lower support frame rear wheel first deflection frame rear affixment (190).

Similarly, attaching the lower support frame rear wheel second deflection frame (150) to the lower support frame (105) are a lower support frame rear wheel second deflection frame front affixment (185) and a lower support frame rear wheel second deflection frame rear affixment (195).

Interspersed between these four attachment points may be the at least one lower support frame mid-frame rail (130).

In some configurations, one or more of the at least one lower support frame mid-frame rail (130) may be forward of the lower support frame rear wheel first deflection frame front affixment (180) and forward of the lower support frame rear wheel second deflection frame front affixment (185).

In some configurations, one or more of the at least one lower support frame mid-frame rail (130) may be rear of the lower support frame rear wheel first deflection frame front affixment (180) and rear of the lower support frame rear wheel second deflection frame front affixment (185), but forward of the lower support frame rear wheel first deflection frame rear affixment (190) and forward of the lower support frame rear wheel second deflection frame rear affixment (195).

In some configurations, one or more of the at least one lower support frame mid-frame rail (130) may be co-linear with the lower support frame rear wheel first deflection frame rear affixment (190) and with the lower support frame rear wheel second deflection frame rear affixment (195).

The lower support frame (105) comprises a first front tire (305) coupled to the lower support frame (105) above the first front tire (305) at an inside corner comprising the lower support frame front rail (120) and the lower support frame first rail (110).

The lower support frame (105) comprises a second front tire (310) coupled to the lower support frame (105) above the second front tire (310) at an inside corner comprising the lower support frame front rail (120) and the lower support frame second rail (115).

The first front tire (305) and the second front tire (310) may be capable of swiveling for steering the safety restraint transport cart (100).

Any at least one front bumper support rail (175) may be used as an at least one front restraint structure (515). The at least one front restraint structure (515) allows restraint of a person to the cart and prevents the person from destabilizing the cart or escaping the cart. See FIG. 1.

Also shown in FIG. 2 is an at least one rear restraint structure (520) coupled to the rear of the lower support frame back rail (125). The at least one rear restraint structure (520) allows restraint of a person to the cart and prevents the person from destabilizing the cart or escaping the cart. See FIG. 10.

Figure 3:
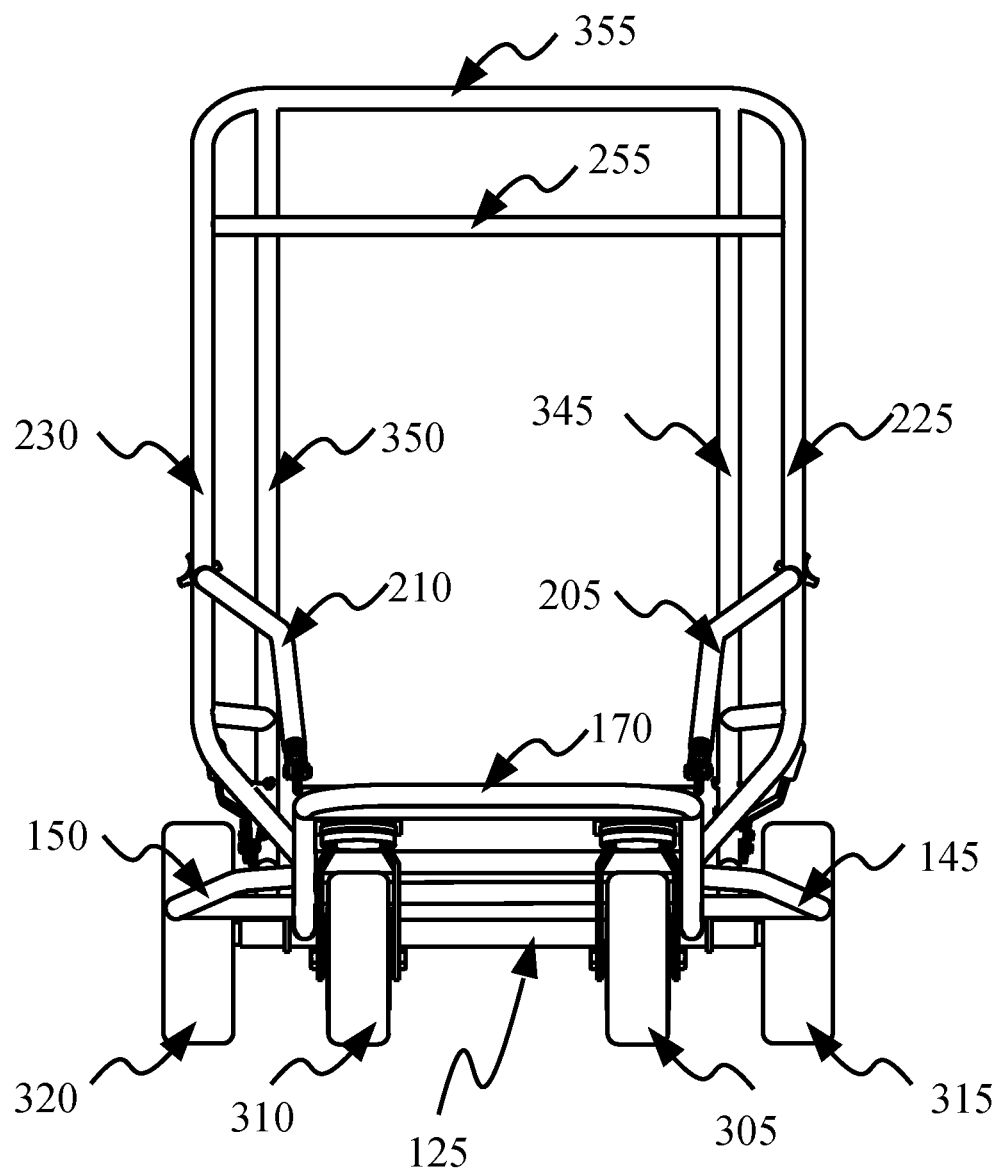
FIG. 3 is a front plan view of a safety restraint transport cart without a net, and showing portions of tire mid-level support frame, and the handling system.

FIG. 3 is a front plan view of a safety restraint transport cart without a net, and showing portions of the mid-level support frame, and the handling system.

Shown in FIG. 3 is a portion of the lower support frame (105), previously discussed, comprising the lower support frame first rail (110), the lower support frame second rail (115), the lower support frame back rail (125), the at least one lower support frame rear wheel deflection frame (145), the lower support frame rear wheel second deflection frame (150), and the front bumper (170).

Also show in FIG. 3 are a mid-level support frame (200) comprising a first side upper rail (205), a left side upper rail lower support frame affixment (210), a second side upper rail (215), a right side upper rail lower support frame affixment (220), an angularly coupled first side rear frame support rail (225), an angularly coupled second side rear frame support rail (230), a left rear mid-level support rail (245), a right rear mid-level support rail (250), and a rear upper rail (255).

Also shown in FIG. 3 is a portion of the handling system (300), comprising a first front tire (305), a second front tire (310), an at least one handle bar support rail (345), a handle bar second support rail (350), and a handle bar (355).

The mid-level support frame (200) operates to provide restraining and securing functions for a restrained person within the safety restraint transport cart (100), as well as to provide stability of the safety restraint transport cart (100) by reducing motions of the restrained person which could de-stabilize the safety restraint transport cart (100).

The mid-level support frame (200) may be fabricated of any material capable of provide restraining and transporting capacities for persons between 100 and 400 pounds, other living creatures, or for materials in circumstances in which restraint against damage or loss during transport is desired. The mid-level support frame (200) may be fabricated of metal, including steel, aluminum, or other metals. The metal may be formed hollow such as pipe or tubing, solid, such as rod or various beam configurations. The mid-level support frame (200) may be fabricated of plastic for perhaps lesser capacity uses, or perhaps with reinforcing materials to assure the safety restraint transport cart (100) provides the necessary restraining and transporting capacities. The plastic may be ABS (Acrylonitrile Butadiene Styrene), Acetal (Polyoxymethylene, POM, Polycarbonate (PC), Polyvinyl Chloride (PVC), or other plastic with higher strength compared to other plastics. The mid-level support frame (200) may be fabricated of wood, or a composite material to provide the appropriate restraining and transporting capacity. The mid-level support frame (200) may be fabricated as one piece, as by molding, casting, sheet cutting, etc., or assembled from one or more pieces.

Of the components of the mid-level support frame (200), the first side upper rail (205) and the second side upper rail (215) operate to provide restraining and securing functions for a restrained person within the safely restraint transport cart (100), as well as to provide stability of the safety restraint transport cart (100) by reducing motions of the restrained person which could de-stabilize the safety restraint transport cart (100). The first side upper rail (205) and the second side upper rail (215) also operate to provide mobility and storage when the safety restraint transport cart (100) is not in use.

The first side upper rail (205) and the second side upper rail (215) each have two ends.

The first side upper rail (205) has a front end angularly coupled at about 30 degrees to the lower support frame first rail (110) adjacent to the lower support frame front rail (120) at the junction of the lower support frame front rail (120) and the front bumper (170).

This coupling, called here a left side upper rail lower support frame affixment (210), may be pivotable to pivot the first side upper rail (205) with respect to the lower support frame (105).

Figure 9:
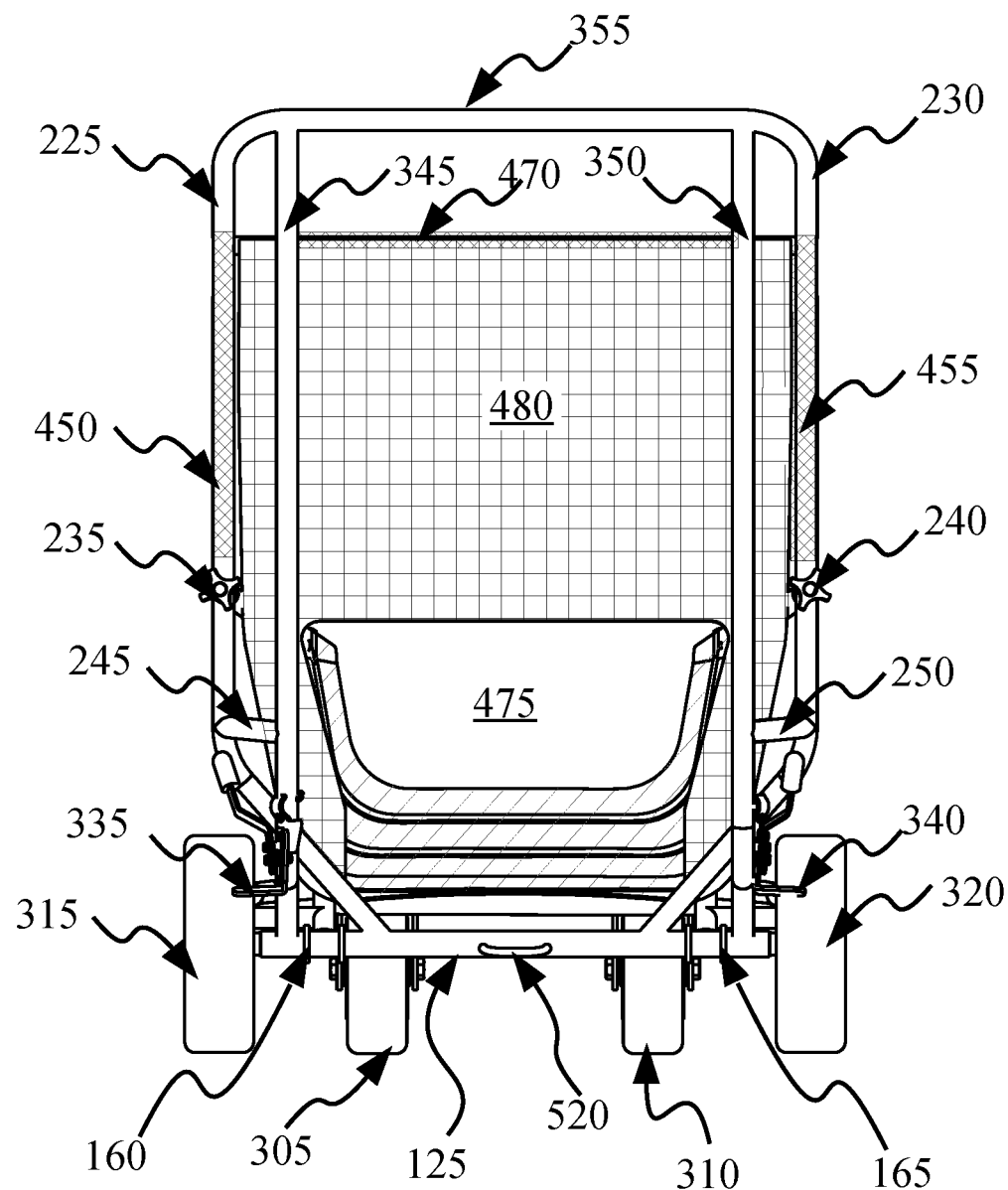
FIG. 9 is a rear plan view of a safely restraint transport cart with a safety restraint net.

The first side upper rail (205) has a back end coupled to an angularly coupled first side rear frame support rail (225). This coupling, a left side upper rail rear affixment (235), may be capable of decoupling the first side upper rail (205) from the angularly coupled first side rear frame support rail (225). FIGS. 8 and 9 show the left side upper rail rear affixment (235) in more detail.

The second side upper rail (215) has a front end angularly coupled at about 30 degrees to the lower support frame second rail (115) adjacent to the lower support frame front rail (120) at the junction of the lower support frame front rail (120) and the front bumper (170).

This coupling, called here a right side upper rail lower support frame affixment (220), may be pivotable to pivot the second side upper rail (215) with respect to the lower support frame (105).

Figure 4:
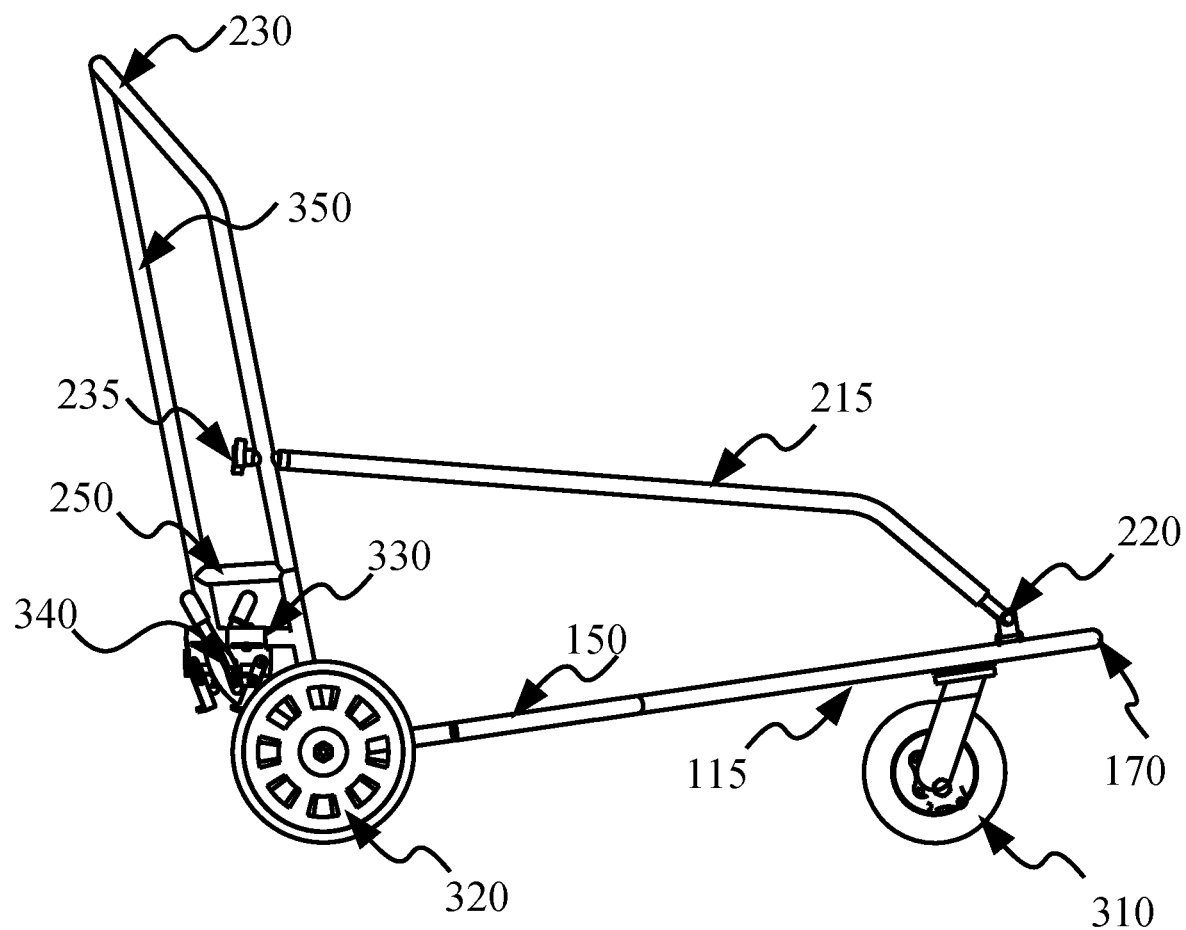
FIG. 4 is a right plan view of a safety restraint transport cart without a net, and showing portions of the mid-level support frame, safety restraint net and net support system, and the handling system.

The second side upper rail (215) has a back end coupled to an angularly coupled second side rear frame support rail (230). This coupling, a right side upper rail rear affixment (240), may be capable of decoupling. FIGS. 4 and 9 show the right side upper rail rear affixment (240) in more detail.

The angularly coupled first side rear frame support rail (225) and the angularly coupled second side rear frame support rail (230) connect and stabilize multiple components of the safety restraint transport cart (100).

The angularly coupled first side rear frame support rail (225) has a top end which couples with a left side of the handle bar (355). The bottom portion of the angularly coupled first side rear frame support rail (225) is shown in FIG. 9.

The angularly coupled second side rear frame support rail (230) has a top end which couples with a right side of the handle bar (355). The bottom portion of the angularly coupled second side rear frame support rail (230) is shown in FIG. 9.

Figure 5:
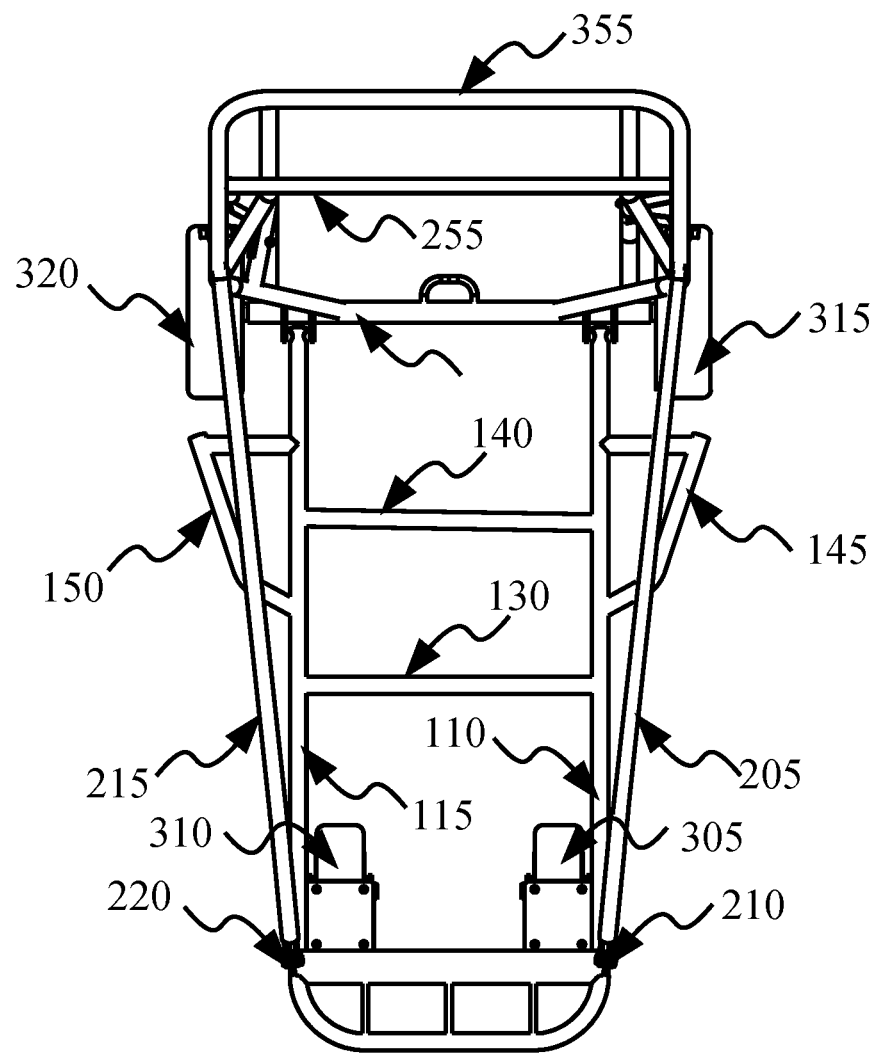
FIG. 5 is a top plan view of a safety restraint transport cart without a net showing the lower support frame and portions of the mid-level support frame and the handling system.
Figure 6:
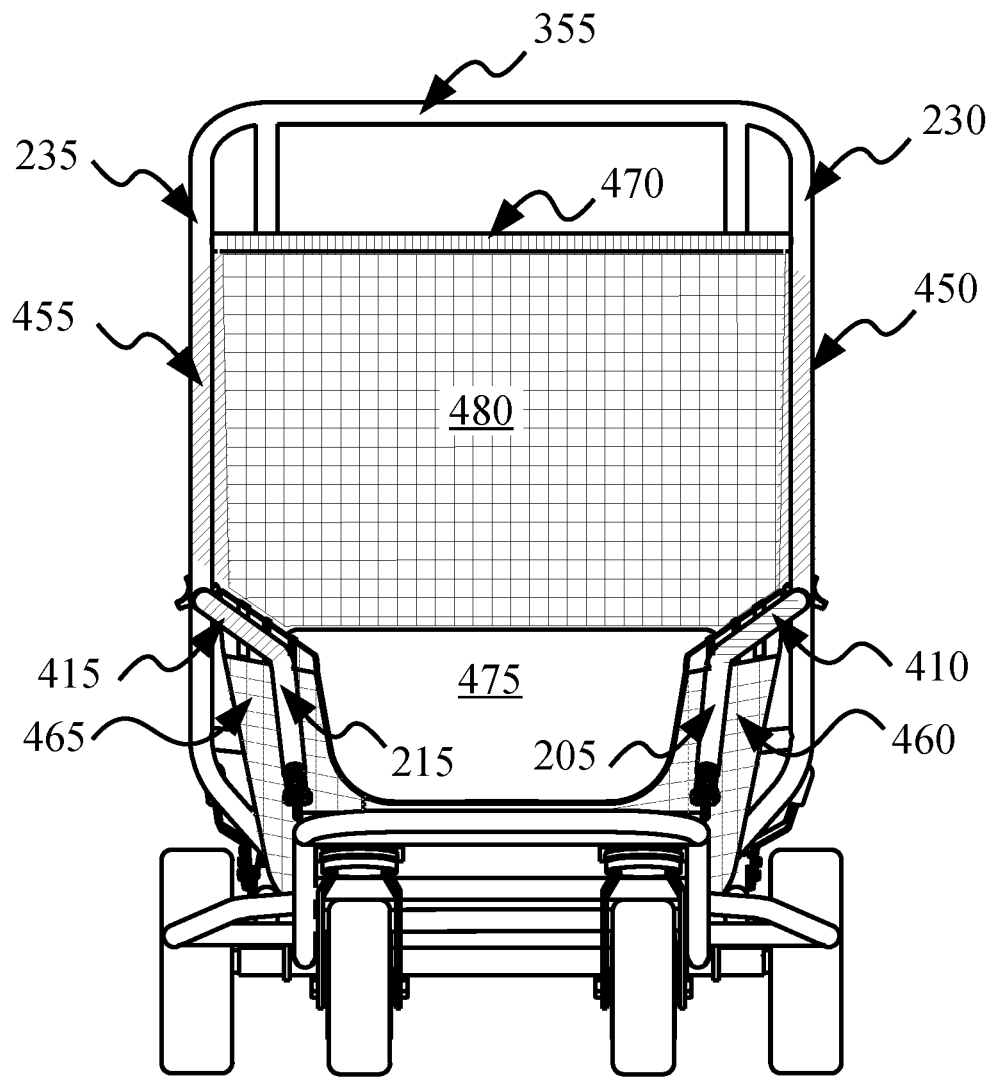
FIG. 6 is a front plan view of a safety restraint transport cart with a safety restraint net.

As shown in FIGS. 5, 6 and 9, tire angularly coupled first side rear frame support rail (225) and the angularly coupled second side rear frame support rail (230) have a substantially vertical mid-section, an angular lower section which for each rail couples to the lower support frame back rail (125) inboard of each rear axle frame pivot (160), and an angular upper section from above each side rail's connection to a rear upper rail (255), and which then angles backward and upward to terminate at top ends to couple with the handle bar (355).

Components coupled to the angularly coupled first side rear frame support rail (225) and the angularly coupled second side rear frame support rail (230) include the first side upper rail (205) and the second side upper rail (215), discussed above The left rear mid-level support rail (245) couples the angularly coupled first side rear frame support rail (225) to the at least one handle bar support rail (345) which provides support for the handle bar (355). The left rear mid-level support rail (245) strengthens the safety restraint transport cart (100) by distributing operating forces and stresses from weight, motion, and movement of a restrained person within the safety restraint transport cart (100) between the angularly coupled first side rear frame support rail (225) and the at least one handle bar support rail (345).

The right rear mid-level support rail (250) couples the second side rear frame support rail (230) to the handle bar second support rail (350), which provide additional side support for the handle bar (355). See FIGS. 5 and 6. The right rear mid-level support rail (250) strengthens the safety restraint transport cart (100) by distributing operating forces and stresses from weight, motion, and movement of a restrained person within the safety restraint transport cart (100) between the angularly coupled second side rear frame support rail (230) and the handle bar second support rail (350).

The rear upper rail (255) is horizontally coupled on a left side to the angularly coupled first side rear frame support rail (225) and horizontally coupled on a right side to the angularly coupled second side rear frame support rail (230) with the rear upper rail (255) coupled to the angularly coupled first side rear frame support rail (225) and to the angularly coupled second side rear frame support rail (230) above and backwards of the first side upper rail (205) and the second side upper rail (215).

This configuration (i) strengthens the safety restraint transport cart (100) by distributing operating forces and stresses from weight, motion, and movement of a restrained person within the safety restraint transport cart (100) between the first side rear frame support rail (225) and the second side rear frame support rail (230), and (ii) operate in conjunction with other rails to secure the safety restraint net (405) to the safety restraint transport cart (100).

The first front tire (305) and the second front tire (310) provide mobility for the safety restraint transport cart (100) so a restrained person may be safety transported. The first front tire (305) and the second front tire (310) may be any material capable of providing restraining and transporting capacities for persons between 100 and 400 pounds, other living creatures, or for materials in circumstances in which restraint against damage or loss during transport is desired. The first front tire (305) and the second front tire (310) may be solid tires, or may be inflated. The wheels for the first front tire (305) and the second front tire (310) may be any material capable of providing restraining and transporting capacities for persons between 100 and 400 pounds, other living creatures, or for materials in circumstances in which restraint against damage or loss during transport is desired. The wheels for the first front tire (305) and the second front tire (310) may be metal, plastic, wood, or a composite of any of these materials.

The at least one handle bar support rail (345) is coupled at a bottom end to the lower support frame back rail (125) and is coupled at a top end to the handle bar (355). Similarly, handle bar second support rail (350) coupled at a bottom end to the lower support frame back rail (125) and is coupled at a top end to the handle bar (355). This configuration assures that handling forces from the operator operate directly on the lower support frame, to the lower support frame back rail (125) is attached, and thus on the first front tire (305), the second front tire (310), the first rear tire (315), and the second rear tire (320).

The handle bar (355) is coupled between the angularly coupled first side rear frame support rail (225) and the angularly coupled second side rear frame support rail (230) so that a left (first) side of the handle bar (355) couples to a top end of the an least one handle bar support rail (345) and to a top end of the first side rear frame support rail (225), while a right side of the handle bar (355) coupled to a top end of the handle bar second support rail (350) and to a top end of the second side rear frame support rail (230).

This positioned the handle bar (355) above and well behind a restrained person so (i) the operator is safe from contact with the restrained person, and (ii) has better leverage with the handle bar to control the safety restraint transport carl (100).

FIG. 4 is a right plan view of a safety restraint transport cart without a net, and showing portions of the mid-level support frame, safety restraint net and net support system, and the handling system. The right plan view is a mirror image of the left plan view.

Shown in FIG. 4 are portions of the lower support frame (105), portions of the mid-level support frame (200), and portions of the handling system (300).

Shown in FIG. 4 is a portion of the lower support frame (105), previously discussed, are the lower support frame second rail (115), the lower support frame rear wheel second deflection frame (150), a side view of and at least one rear axle (155), and the front bumper (170).

Previously discussed portions of the mid-level support frame (200) shown in Fig. 4 are the second side upper rail (215), the right side upper rail lower support frame affixment (220), and the second side rear frame support rail (230).

Other portions of the mid-level support frame (200) shown in FIG. 4 are a right side upper rail rear affixment (240) and a right rear mid-level support rail (250). These portions of the mid-level support frame (200) may be fabricated as described for FIG. 2.

The right side upper rail rear affixment (240) operates to secure the second side upper rail (215) to the second side rear frame support rail (230), thus providing stability and security of the second side upper rail (215) in restraining a person within the safety restraint transport cart (100). As shown in FIG. 8, the right side upper rail rear affixment (240) has a left side counterpart, the left side upper rail rear affixment (235).

The right rear mid-level support rail (250) connects between the second side rear frame support rail (230) and the handle bar second support rail (350), which provide right side support for the handle bar (355). See FIGS. 5 and 6. The right rear mid-level support rail (250) strengthens the safety restraint transport cart (100) by distributing operating forces and stresses from weight, motion, and movement of a restrained person within the safety restraint transport cart (100) between the second side rear frame support rail (230) and the handle bar second support rail (350).

Also shown in FIG. 4 are portions of the handling system (300), including a second rear tire brake rail (330), a second rear tire brake (340), and a handle bar second support rail (350).

The right rear mid-level support rail (250) and the second rear tire brake rail (330) may be fabricated of any material capable of provide restraining and transporting capacities for persons between 100 and 400 pounds, other living creatures, or for materials in circumstances in which restraint against damage or loss during transport is desired. The right rear mid-level support rail (250) and the second rear tire brake rail (330) may be fabricated of metal, including steel, aluminum, or other metals. The metal may be formed hollow such as pipe or tubing, solid, such as rod or various beam configurations. The first rear tire brake rail (325) and the second rear tire brake rail (330) may be fabricated of plastic for perhaps lesser capacity uses, or perhaps with reinforcing materials to assure the safety restraint transport cart (100) provides the necessary restraining and transporting capacities. The plastic may be ABS (Acrylonit Butadiene Styrene), Acetal (Polyoxymethylene, POM, Polycarbonate (PC), Polyvinyl Chloride (PVC), or other plastic with higher strength compared to other plastics. The lower support frame (105) may be fabricated of wood, or a composite material to provide the appropriate restraining and transporting capacity. The right rear mid-level support rail (250) and the second rear tire brake rail (330) may be fabricated as one piece, as by molding, casting, sheet cutting, etc., or assembled from one or more pieces.

The second rear tire brake rail (330) connects below the right rear mid-level support rail (250) between the second side rear frame support rail (230) and the handle bar second support rail (350). The second rear tire brake rail (330) operates primarily to support the second rear tire brake (340) in place beside the second rear tire (320), while the second rear tire brake (340) provides an operator of the safety restraint transport cart (100) to secure the safety restraint transport cart (100) from motion, either while in non-use, or during loading or unloading of the safety restraint transport cart (100). As with the right rear mid-level support rail (250), the second rear tire brake rail (330) also operates to strength the safety restraint transport cart (100) by distributing operating forces and stresses from weight, motion, and movement of a restrained person within the safety restraint transport cart (100) between the second side rear frame support rail (230) and the handle bar second support rail (350).

FIG. 5 is a top plan view of a safety restraint transport cart without a net showing the lower support frame (105), portions of the mid-level support frame (200), portions of the handling system (300), and portions of the safety restraint system (500).

Shown in FIG. 5 is a portion of the lower support frame (105), previously discussed, comprising the lower support frame first rail (110), the lower support frame second rail (115), the lower support frame front rail (120), the lower support frame back rail (125), a plurality of the at least one lower support frame mid-frame rail (130), the at least one lower support frame rear wheel deflection frame (145), the lower support frame rear wheel second deflection frame (150), the left rear axle frame pivot (160), the right rear axle frame pivot (165), the front bumper (170), and the at least one front bumper support rail (175).

Other portions of the lower support frame (105) shown in FIG. 5 are the mid-level support frame (200) comprising a first side upper rail (205), a left side upper rail lower support frame affixment (210), a second side upper rail (215), angularly coupled first side rear frame support rail (225), angularly coupled second side rear frame support rail (230), left rear mid-level support rail (245), right rear mid-level support rail (250), and a rear upper rail (255).

The mid-level support frame (200) supports the -safety restraint transport cart (100) above the lower support frame (105) to provide structural support of the structures of the mid-level support frame (200) as well between the handling system (300) and the lower support frame (105), and the mid-level support frame (200) provides contouring support for and restraint of the person within the -safety restraint transport cart (100).

As shown in FIG. 5, the first side upper rail (205) and the second side upper rail (215) extend from the lower support frame front rail (120) to the angularly coupled first side rear frame support rail (225) and the angularly coupled second side rear frame support rail (230), thereby limiting lateral distortion of the safety restraint transport cart (100), which could injure the person within the safety restraint transport cart (100) (even if causing the lateral distortion), as well as damage the safety restraint transport cart (100).

As shown in FIG. 5, the first side upper rail (205) and the second side upper rail (215) are further apart from each other at the rear—at the angularly coupled first side rear frame support rail (225) and the angularly coupled second side rear frame support rail (230)—than at the lower support frame front rail (120) at that front of the safety restraint transport cart (100). This narrowing of the region around the restrained person (i) enhances a structural confinement ability by providing for a contoured net with less open space around the restrained person (see FIG. 1) to reduce space around a restrained person to resist restraint and transport, as well as (ii) provides a psychological confinement connotation to minimize a desire of a restrained person to resist restraint and transport.

The angularly coupled first side rear frame support rail (225) and angularly coupled second side rear frame support rail (230) are coupled to the lower support frame back rail (125) longitudinally inline and behind the first front tire (305) and the second front tire (310) respectively, then extend angularly outward and upward above the first rear tire (315) and the second rear tire (320) respectively, then run vertically to the rear upper rail (255), then (see FIGS. 1 4, and 8) transition angularly backwards to the handle bar (355). This combination inline and angular design strategically places the handle bar couplings at locations that increase an operator's handling ability with less handling forces.

First, as discussed above, the wider separation between the angularly coupled first side rear frame support rail (225) and the angularly coupled second side rear frame support rail (230) at the rear than at the front improves the physical and psychological restraint ability of the safety restraint transport cart (100).

Second, the wider separation between the angularly coupled first side rear frame support rail (225) and the angularly coupled second side rear frame support rail (230) provides for a wider a rear upper rail (255) which provides rear and height support for the safety restraint net (405, see below).

Third, coupling of the first side upper rail (205) to the angularly coupled first side rear frame support rail (225) and of the second side upper rail (215) to the angularly coupled second side rear frame support rail (230), and then to the a lower support frame back rail (125) provides for directing movement forces (i.e., thrashing, etc.) of a restrained person and from transport from the angularly coupled first side rear frame support rail (225) and the angularly coupled second side rear frame support rail (230) to the lower support frame (105). This force transfer thereby minimizes risks for damage to the safety restraint transport cart (100), rollover of the safety restraint transport cart (100), other mishaps, as well as injury to the restrained person.

Fourth, angular coupling of the first side upper rail (205) and the second side upper rail (215) to the lower support frame back rail (125) minimizes overall width of the safety restraint transport cart (100) so the -safety restraint transport cart (100) may be taken into buildings, through hallways, into treatment rooms, as well as into handling rooms in secure facilities.

Fifth, angular coupling of the first side upper rail (205) and the second side upper rail (215) to the lower support frame back rail (125) provides spacing for a an least one handle bar support rail (345) and a handle bar second support rail (350) to couple vertically to the lower support frame back rail (125) and provide for improved handling of the safety restraint transport cart (100).

Also shown in FIG. 5 is a portion of the handling system (300), including a an least one handle bar support rail (345), a handle bar second support rail (350), and a handle bar (355). As mentioned above, the an least one handle bar support rail (345) and the handle bar second support rail (350) are coupled vertically, albeit with a slight backwards tilt, at a bottom end of each structure to the lower support frame back rail (125), and then coupled at a top end of each structure to a handle bar (355). In this angular configuration, with swivel capable front tires and straight back tires, the handle bar (355) provides for easy handling and control of the safety restraint transport cart (100).

Figure 10:
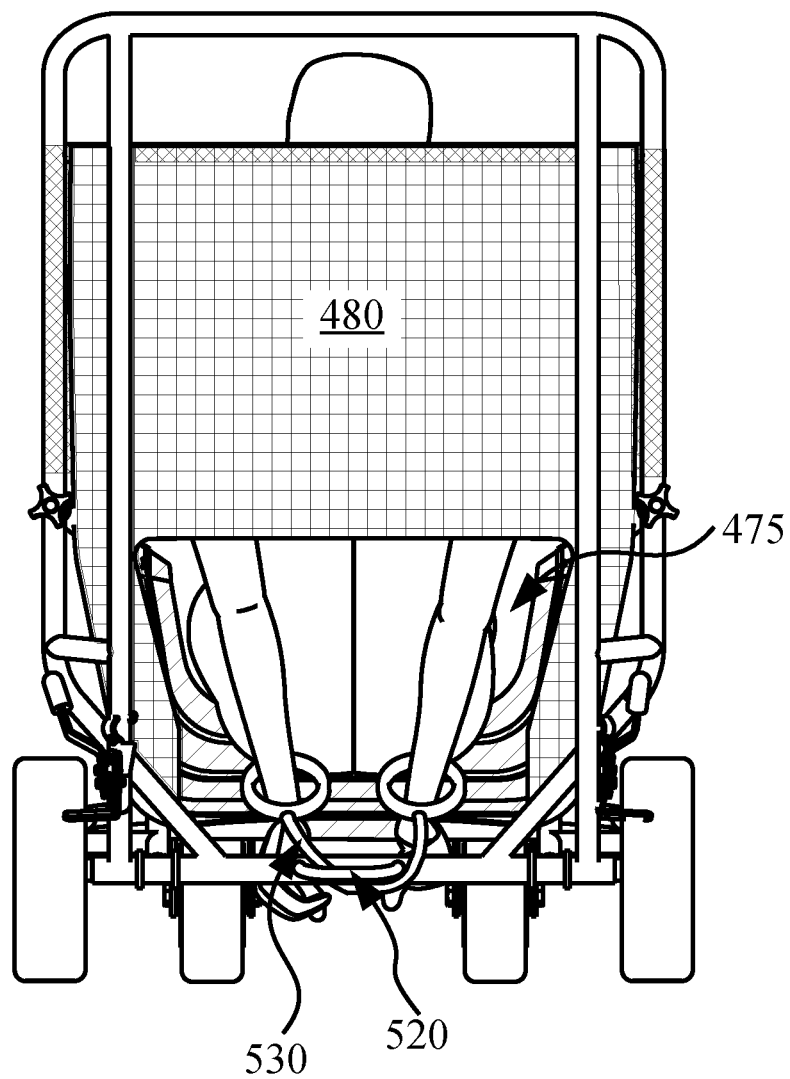
FIG. 10 is a rear plan view of a safety restraint transport cart with a net and a restrained person.

Also shown in FIG. 5 is a portion of the safety restraint system (500), including an at least one front restraint structure (515), and an at least one rear restraint structure (520). As shown in FIG. 1, an at least one front restraint structure (515) may be used with the at least one front bumper support rail (175) to restrain a person to the safety restraint transport cart (100). The at least one front restraint structure (515) may be looped under a at least one front bumper support rail (175), or around one or more the at least one front bumper support rail (175). At the rear or the safety restraint transport cart (100), an at least one rear restraint structure (520) provides for securing a person via the hands to the -safety restraint transport cart (100). As shown in FIG. 10, restraint devices may be looped through the at least one rear restraint structure (520), or for longer restraint devices but which do not fit through the at least one rear restraint structure (520), the at least one rear restraint structure (520) may be used to loop a restraint device through itself.

FIG. 6 is a front plan view of a safety restraint transport cart with a safety restraint net and net support system (400).

Shown in FIG. 6 are portions of the lower support frame (105), portions of the mid-level support frame (200), portions of the handling system (300), and portions of a safety restraint net and net support system (400).

The portions of the lower support frame (105), previously discussed, shown include the lower support frame front rail (120), the lower support frame back rail (125), the at least one lower support frame mid-frame rail (130), and the front bumper (170).

The portions of the mid-level support frame (200), previously discussed, shown include the left angularly coupled first side rear frame support rail (225), the angularly coupled second side rear frame support rail (230), and the rear upper rail (255), the side an least one handle bar support rail (345), the handle bar second support rail (350), and the handle bar (355).

The portions of the handling system (300), previously discussed, shown include the an least one handle bar support rail (345), the handle bar second support rail (350), the handle bar (355), the first front tire (305), the second front tire (310), the first rear tire (315), and the second rear tire (320).

Figure 7:
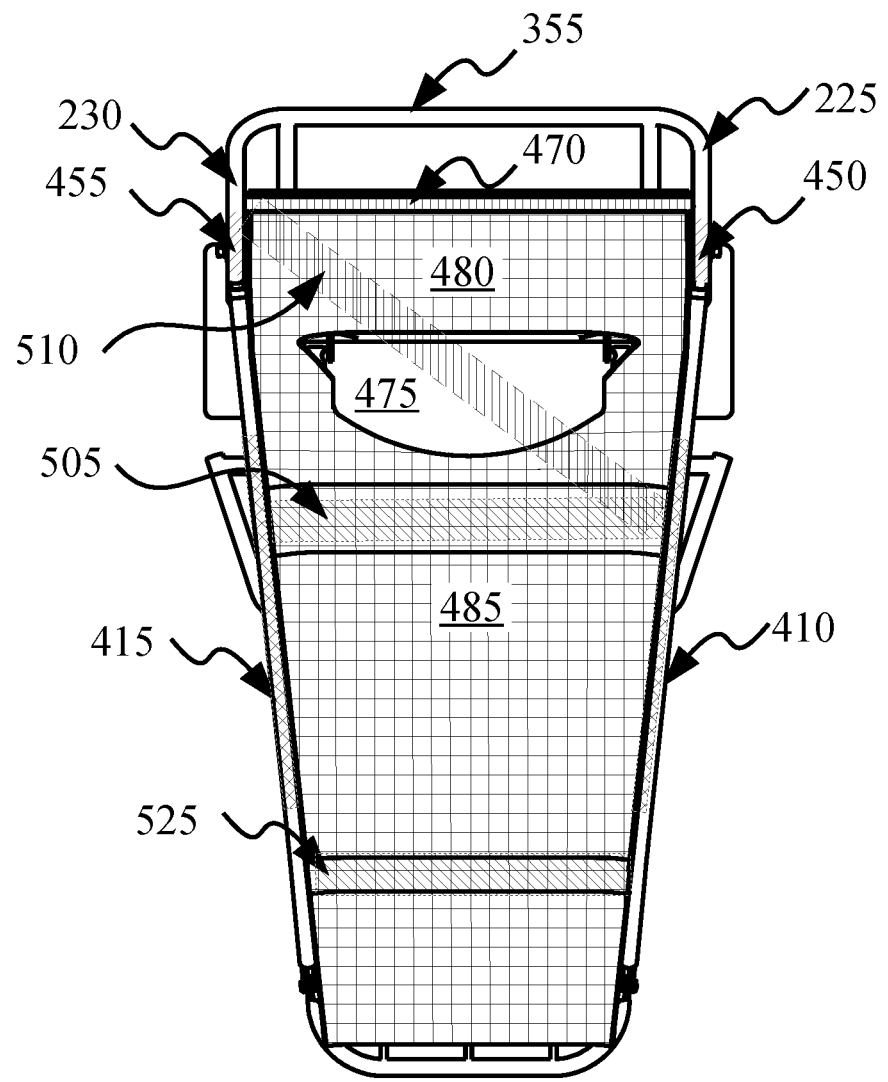
FIG. 7 is a top plan view of a safely restraint transport cart with a safely restraint net.

Also shown in FIG. 6 is a portion of the a safety restraint net and net support system (400), including a safety restraint net (405), a first side upper rail net affixment (410), a second side upper rail net affixment (415), a first side rear frame support rail net affixment (450), a second side rear frame support rail net affixment (455), a safety restraint net left section (460), a safety restraint net right section (465), a rear upper rail net affixment (470), a safety restraint net arms and hands non-compression structure (475), a safety restraint net back section (480), and a safety restraint net arms and hands non-compression structure (475), and a tapered front end (490). A lower support frame net bottom section (485) is shown in FIG. 7.

The safety restraint net (405) operates to provide secure restraint for the restrained person, and safety for the operator of the safety restraint transport cart (100). In addition, a safety restraint net (405) should prevent injury to the restrained person, and if alleviating discomfort for a restrained person may, such a safety restraint net (405) could reduce a likelihood of combativeness due to discomfort.

The safety restraint net (405) may be made of a porous, tear resistant material that allows liquid and air to pass through. This allows easy cleaning with soap and water, or a virucide, then allowed to air dry. The safety restraint net (405) may be made of fabric, plastic, fabric covered plastic, metal wires, coated wires or wires secured to padding to prevent injury, composite materials of these material, or of any material capable of providing secure and safe restraint, preferably with sufficient comfort for restrained person to prevent injury, and to reduce a likelihood of combativeness due to discomfort. The plastic may be ABS (Acrylonitrile Butadiene Styrene), Acetal (Polyoxymethylene, POM, Polycarbonate (PC), Polyvinyl Chloride (PVC), or other plastic with higher strength compared to other plastics.

These materials could be coated with fabric, plastic, or composite materials to aid comfort. These materials could be treated or coated to prevent liquid absorption, which increases the life span of the safety restraint net (405), mitigates the spread of injurious organisms, and increases the safety of the safety restraint transport cart (100) of the person accompanying the restrained person.

The first side upper rail net affixment (410) affixes the safety restraint net left section (460) to the first side upper rail (205). The second side upper rail net affixment (415) affixes the safety restraint net right section (465) to the second side upper rail (215).

The safety restraint net left section (460) provides physical and psychological restraint on the left side of a restrained person and is affixed to the first side upper rail (205) with the first side upper rail net affixment (410).

The safety restraint net right section (465) provides physical and psychological restraint on the right side of a restrained person and is affixed to the second side upper rail (215) with the second side upper rail net affixment (415).

On the left side of the safety restraint transport cart (100), a first side rear frame support rail net affixment (450) affixes and secures the safety restraint net back section (480) to the angularly coupled first side rear frame support rail (225). On the right side of the safety restraint transport cart (100), a second side rear frame support rail net affixment (455) affixes and secures the safety restraint net back section (480) to the angularly coupled second side rear frame support rail (230).

Below and in front of the handle bar (355), a rear upper rail net affixment (470) affixes and secures the safety restraint net (405) to the rear upper rail (255).

Each of these affixments may comprise one or more net affixment sections. A net affixment section may be wrapped and stitched around a respective rail. A net affixment section may be wrapped and mechanically affixed around a respective rail, including through using rivets, pins, staples, thermal affixment, glue, hot meld, etc.

A net affixment section may be chemically affixed to or around a respective rail, including the molding a net affixment section around a respective rail, forming the net affixment section partially within a respective rail, as with portion formed to form as a wedge behind a hole or slot within a respective rail.

Also shown in FIG. 6 is a safety restraint net arms and hands non-compression structure (475) capable of providing a non-compressive space behind a restrained person within the safety restraint net (405). The safety restraint net arms and hands non-compression structure (475) provides a non-compressive space behind a restrained person to alleviate compression injury of the arms and hands of a restrained person whose arms are against the safety restraint net back section (480). See FIG. 10.

The tapered front end (490) provides the safety restraint net (405) with a smaller width at a front bumper (170) of the lower support frame (105) than at lower support frame back rail (125) to provides less space around a person, which (i) confines the movements of the person to a smaller area, (ii) thereby reducing the person's momentum of movement, and (iii) decreasing the risk of injury to the operator, injury to the person, and damage to the safety restraint transport cart.

FIG. 7 is a top plan view of a safety restraint transport cart with a safety restraint net (405).

Shown in FIG. 7 is a portion of the lower support frame (105), previously discussed, a portion of the mid-level support frame (200), previously discussed, a portion of the handling system (300), previously discussed, the safety restraint net and net support system (400), and a portion of the a safety restraint system (500).

Shown in FIG. 7 are the lower support frame rear wheel deflection frame (145) and the lower support frame rear wheel second deflection frame (150), above which are the first side upper rail (205) and the a second side upper rail (215) hidden within the first side upper rail net affixment (410) and the second side upper rail net affixment (415) respectively.

Attached to and along the lower support frame (105) along with the lower support frame rear wheel deflection frame (145) and the lower support frame rear wheel second deflection frame (150) are an at least one lower support frame net affixment (420) and an least one lower support frame second rail net affixment (425).

The at least one lower support frame net affixment (420) affixes the safety restraint net (405) to the lower support frame first rail (110).

The at least one lower support frame second rail net affixment (425) affixes the safety restraint net (405) to the lower support frame second rail (115).

As shown in FIG. 7, an at least one lower support frame net affixment (420) and the an least one lower support frame second rail net affixment (425) may comprise a plurality of net affixments. As shown in FIG. 7, an at least one lower support frame net affixment (420) and an least one lower support frame second rail net affixment (425) affix and secure the safety restraint net (405) to the lower support frame (105) behind the first front tire (305) and the second front tire (310).

Just in front of the lower support frame rear wheel deflection frame (145) and the lower support frame rear wheel second deflection frame (150) may be a lower support frame first rail mid-frame net affixment (430) and a lower support frame second rail mid-frame net affixment (435) respectively to affix and secure the safety restraint net (405) to the lower support frame (105).

Just behind the lower support frame rear wheel deflection frame (145) and the lower support frame rear wheel second deflection frame (150) may be a lower support frame first rail rear net affixment (440) and a lower support frame secondrail rear net affixment (445) may affix and secure the safety restraint net (405) to the lower support frame (105).

As previously shown in FIG. 1, the safety restraint net left section (460) and the safety restraint net right section (465) are positioned obliquely towards the lower support frame net bottom section (485), and tapered towards the front of the safety restraint transport cart (100). This taper aids to maintain a relatively equal distance between the safety restraint net left section (460) and the safety restraint net right section (465) and a restrained person. FIG. 1.

The safety restraint net (405) also includes a lower support frame net bottom section (485), and a safety restraint net arms and a hands non-compression structure (475).

The lower support frame net bottom section (485) couples with the safety restraint net left section (460), the safety restraint net right section (465), and the safety restraint net back section (480) to complete overall physical and psychological restraint to a restrained person. The lower support frame net bottom section (485) has an at least one lower support frame net affixment (420) to secure the lower support frame net bottom section (485) to the lower support frame (105) and to provide for secure and easy attachment of the net to the cart.

The safety restraint net back section (480) provides physical and psychological restraint to the back and head of a restrained person. The safety restraint net back section (480) has a plurality of affixements to secure the safety restraint net back section (480) to provide for secure and easy attachment of the net to the cart.

Below and in front of the handle bar (355), a rear upper rail net affixment (470) affixes and secures the safety restraint net (405) to the rear upper rail (255).

Also shown in FIG. 7 is a safety restraint net arms and hands non-compression structure (475). The safety restraint net arms and hands non-compression structure (475) operates to provide a non-compressive space behind a restrained person to alleviate compression injury of the arms and hands of a restrained person who are arms are against the safety restraint net back section (480). See FIG. 10.

Also shown in FIG. 7 is a safety restraint system (500). The safety restraint system (500) may include an at least one lap belt (505), an at least one shoulder belt (510), an at least one front restraint structure (515), an at least one rear restraint structure (520) and an at least one leg restraint structure (525).

The an at least one lap belt (505) may be affixed to the lower support frame net bottom section (485) to extend over a lap of a restrained person to restrain the person to the cart and prevent the person from destabilizing the cart or escaping the cart.

The least one shoulder belt (510) may be affixed to the rear upper rail net affixment (470) and operates to extend over a shoulder of a restrained person to restrain the person to the cart and prevent the person from destabilizing the cart or escaping the cart.

The at least one front restraint structure (515) may be affixed to the at least one front bumper support rail (175) to restrain a person to the cart and prevent the person from destabilizing the cart or escaping the cart.

The at least one rear restraint structure (520) may be affixed to the lower support frame back rail (125) to restrain a person to the cart and prevent the person from destabilizing the cart or escaping the cart.

The at least one leg restraint structure (525) may be affixed between the safety restraint net left section (460) and the safety restraint net right section (465) to restrain a person to the cart and prevents the person from destabilizing the cart or escaping the cart.

FIG. 8 is a left plan view of a safety restraint transport cart with a safety restraint net. The left plan view is a mirror image of the left right view.

Shown in FIG. 8 is a portion of the lower support frame (105), previously discussed, a portion of the a mid-level support frame (200), previously discussed, a portion of the handling system (300), part of which is previously discussed, and part of the safety restraint net and net support system (400), previously discussed.

Of topic for discussion in FIG. 8 are portions of the handling system (300) and the safety restraint net and net support system (400), not previously discussed.

Shown in FIG. 8 for discussion are a left rear mid-level support rail (245), a first rear tire brake rail (325), an at least one rear tire brake (335), a first side upper rail net affixment (410), an at least one lower support frame net affixment (420), a lower support frame first rail mid-frame net affixment (430), and a lower support frame first rail rear net affixment (440). Each of these structures has a corresponding structure on the mirror image side of the safety restraint transport cart (100).

The left rear mid-level support rail (245) is situated in a location which would be mid-back behind a restrained person to couple the angularly coupled first side rear frame support rail (225 to the an least one handle bar support rail (345). This location and coupling distributes any load and forces exerted to the back of the safety restraint transport cart (100), thus increasing the strength and stability of cart, particularly with an agitated person restrained in the cart.

A first rear tire brake rail (325), which also couples the angularly coupled first side rear frame support rail (225) to the an least one handle bar support rail (345) is similarly strategically located, here above the first rear tire (315) and below a left rear mid-level support rail (245) thereby providing additional strength, and also to position an easily operable foot brake near an operator's feet for easy braking. Affixed to the first rear tire brake rail (325) and positioned above the first rear tire (315) is an easily operable brake for easy braking and to prevent free-run of cart when stopped, particularly with agitated persons restrained in the cart.

The first side upper rail net affixment (410) affixes the safety restraint net left section (460) to the first side upper rail (205). The first side upper rail net affixment (410) may comprise a single net affixment, or a plurality of net affixments to affix the safety restraint net left section (460) to the first side upper rail (205).

Along the left side of the lower support frame (105) is an at least one lower support frame net affixment (420). The at least one lower support frame net affixment (420) provides for secure attachment of the safety restraint net (405) to the cart.

When the lower support frame (105) has an at least one lower support frame mid-frame rail (130), a plurality of the at least one lower support frame net affixment (420) may be used, as on either side of the one or more an at least one lower support frame mid-frame rail (130).

In such a structure, the at least one lower support frame net affixment (420) may comprise a lower support frame front net affixment, a lower support frame first rail mid-frame net affixment (430), or a lower support frame first rail rear net affixment (440), or more than one of the lower support frame front net affixment, lower support frame first rail mid-frame net affixment (430), or lower support frame first rail rear net affixment (440). Having a plurality of the at least one lower support frame rail net affixment provides greater strength and stability of the safety restraint net (405), particularly with an agitated person restrained in the cart.

As with the safety restraint net (405) a lower support frame net affixment may be made of fabric, fabric covered plastic, metal wires, coated wires or wires secured to padding to prevent injury, composite materials of these material, or of any material capable of providing secure and safe restraint with sufficient comfort for restrained person to prevent injury, and also to alleviate discomfort, which reduces a likelihood of combativeness to discomfort.

These materials could be coated with fabric, plastic, or composite materials to aid comfort. These materials could be treated or coated to prevent liquid absorption, which increases the life span of the safety restraint net (405), mitigates the spread of injurious organisms, and increases the safety of the safety restraint transport cart (100) of the person accompanying the restrained person.

The net affixments may be wrapped loops, stitched loops, mesh straps, solid straps, elastic straps, etc. of desired width and length. So long as the net affixments provide secure restraint of the restrained person, and safety for the operator and restrained person, any satisfactory material may be used.

FIG. 9 is a rear plan view of a safety restraint transport cart with a safety restraint net.

Shown in FIG. 9 are a portion of the lower support frame (105), previously discussed, a portion of the mid-level support frame (200), previously discussed, a portion of the handling system (300), previously discussed, a portion of the safety restraint net and net support system (400), previously discussed, a portion of the a safety restraint system (500), previously discussed.

Shown in FIG. 9 for discussion are portions of the lower support frame (105), including a left rear axle frame pivot (160) coupling the an least one handle bar support rail (345) to the lower support frame back rail (125), and a right rear axle frame pivot (165) coupling the handle bar second support rail (350) to the lower support frame back rail (125).

As shown in FIG. 2, the left rear axle frame pivot (160) and the right rear axle frame pivot (165) are coupled to the lower support frame first rail (110) and the lower support frame second rail (115) respectively. When the left side upper rail rear affixment (235) and the right side upper rail rear affixment (240) are decoupled, the left rear axle frame pivot (160) and the right rear axle frame pivot (165) are capable of rotation as to reduce an angular separation of the lower support frame (105) to the an least one handle bar support rail (345) and the handle bar second support rail (350) from more than 90 degrees to less than 90 degrees.

Shown in FIG. 9 for discussion are portions of the mid-level support frame (200), including the angularly coupled first side rear frame support rail (225), the angularly coupled second side rear frame support rail (230), a left side upper rail rear affixment (235), a right side upper rail rear affixment (240), a left rear mid-level support rail (245), and a right rear mid-level support rail (250), portions of the handling system (300), including a second rear tire brake rail (330), a second rear tire brake (340), a first rear tire (315), a second rear tire (320), an at least one rear tire brake (335), a second rear tire brake (340), a an least one handle bar support rail (345), a handle bar second support rail (350), and a handle bar (355), and portions of the safety restraint net and net support system (400), including a safety restraint net (405), a rear upper rail net affixment (470), a safety restraint net arms and hands non-compression structure (475), a safety restraint net back section (480), and an at least one rear restraint structure (520).

The angularly coupled first side rear frame support rail (225) has a bottom end which is coupled to the lower support frame back rail (125) longitudinally inline and behind the first front tire (305), then pitched outward and above a first rear tire (315), thence upwards with an angular pitch backwards of 5 to 25 degrees. The angularly coupled first side rear frame support rail (225) may have an angle of about 30 degrees with respect to the lower support frame back rail (125).

The angularly coupled second side rear frame support rail (230) has a bottom end which is coupled to the lower support frame back rail (125) longitudinally inline and behind the second front tire (310), then pitched outward above a second rear tire (320), thence upwards with an angular pitch backwards of 5 to 25 degrees. The angularly coupled second side rear frame support rail (230) may have an angle of about 30 degrees with respect to the lower support frame back rail (125).

A left side upper rail rear affixment (235) allows decoupling of the back end of the first side upper rail (205) from the angularly coupled first side rear frame support rail (225), which then allows folding of cart for moving and storage. The left side upper rail rear affixment (235) is located on the angularly coupled first side rear frame support rail (225), and above the left rear mid-level support rail (245).

A right side upper rail rear affixment (240) allows decoupling of the back end of the second side upper rail (215) from the second side rear frame support rail (230), which then allows folding of cart for moving and storage. The right side upper rail rear affixment (240) is located on the second side rear frame support rail (230), and above the right rear mid-level support rail (250).

The left side upper rail rear affixment (235) and the right side upper rail rear affixment (240) may be any device capable of allowing detachment of the first side upper rail (205) and of the second side upper rail (215) respectively from the angularly coupled first side rear frame support rail (225) and the angularly coupled second side rear frame support rail (230), respectively, to allow folding of safety restraint transport cart (100) for moving and storage. The left side upper rail rear affixment (235) and the right side upper rail rear affixment (240) may be a nut and bolt arrangement with the bolt affixed to the back end of the first side upper rail (205) and the second side upper rail (215) respectively, and a nut, such as a wing nut, or a nut affixed within a collar, and threaded or affixed to the bolt. An unthreaded bolt and pin could also be used, such as a cotter pin, pin clip, clevis pin, etc., (though a pin might cause an injury).

Located on the left and right sides of the safety restraint transport cart (100) above the first rear tire (315) and the second rear tire (320) and the at least one rear tire brake (335) and the second rear tire brake (340) is a pair of structures, a left rear mid-level support rail (245) and a right rear mid-level support rail (250).

The left rear mid-level support rail (245) connects between the angularly coupled first side rear frame support rail (225), which supports a safety restraint net back section (480), and the an least one handle bar support rail (345), which provide left side support for the handle bar (355).

The right rear mid-level support rail (250) connects between the angularly coupled second side rear frame support rail (230), which supports the safety restraint net back section (480), and the handle bar second support rail (350), which provides right side support for the handle bar (355).

The left rear mid-level support rail (245) and the right rear mid-level support rail (250) strengthen the safety restraint transport cart (100) by distributing operating forces and stresses from weight, motion, and movement of a restrained person within the safety restraint transport cart (100) between the angularly coupled first side rear frame support rail (225) and the angularly coupled second side rear frame support rail (230) and the an least one handle bar support rail (345) and the handle bar second support rail (350). This strengthening is important, particularly when restraining or transporting agitated persons.

In addition, the an least one handle bar support rail (345) and the handle bar second support rail (350) are angled backwards above the angularly coupled first side rear frame support rail (225) so the handle bar (355) is behind the restrained person and lower to improve handling control and turning ability.

Not quite visible in FIG. 9 (but see FIG. 8) are a pair of structures for supporting the rear tire brakes. These structures, the first rear tire brake rail (325) and the second rear tire brake rail (330), couple the angularly coupled first side rear frame support rail (225) and the angularly coupled second side rear frame support rail (230) to the an least one handle bar support rail (345) and the handle bar second support rail (350), and are strategically located above the first rear tire (315) and the second rear tire (320) to (1) provide additional strength to the safety restraint transport cart (100) behind the lower back of an agitated person, which can act as a focal point for agitated movement, and (2) to position an easily operable rear tire brake near an operator's feet for easy and fast braking.

Affixed to the first rear tire brake rail (325) and the second rear tire brake rail (330) and positioned above the first rear tire (315) and the second rear tire (320) are an easily operable first rear tire brake rail (325) and a second rear tire brake rail (330) for easy and fast braking and to prevent free-run of cart when stopped, particularly with agitated persons restrained in the cart.

As shown, the first rear tire brake rail (325) and the second rear tire brake rail (330) have a substantially horizontal tab which presses against the respective tire to lock the tire when the corresponding somewhat vertical handle is pulled backwards. This particular design may be used as a hand brake, or a foot brake.

Other brake configurations are possible, including tabs for foot actuation, wheel hub brakes, cam brakes, etc. Other brakes may be used, though small hand brakes place the operator closer to the restrained person.

Below the first rear tire brake rail (325) and the second rear tire brake rail (330) and beside the first rear tire brake rail (325) and the second rear tire brake rail (330) are the first rear tire (315) and the second rear tires (320). The first rear tire (315) and the second rear tire (320) may be installed on a common axle, albeit with bearings to permit independent turning, or may be installed with separate axles in the lower support frame back rail (125).

As indicated in the drawings, the first rear tire (315) and the second rear tire (320) have a larger diameter than the first front tire (305) and the second front tire (310) and are coupled inline to the lower support frame back rail (125).

As shown, the first front tire (305) and the second front tire (310) are coupled to the lower support frame (105) via castors above the tires, which has the effect to raise the lower support frame front rail (120) above the lower support frame back rail (125) when all four tires are on level ground.

In this configuration, the first front tire (305) is coupled to the lower support frame (105) above the first front tire (305) between the lower support frame first rail (110) and the lower support frame front rail (120) at an inside corner comprising the lower support frame front rail (120) and the lower support frame first rail (110).

Similarly, in this configuration, the second front tire (310) is coupled to the lower support frame (105) above the second front tire (310) between the lower support frame first rail (110) and the lower support frame front rail (120) at an inside corner comprising the lower support frame front rail (120) and the lower support frame second rail (115).

When the safety restraint transport cart (100) rests on a level surface, the lower support frame front rail (120) rests at a higher height with respect to the at least one rear axle (155).

This configuration places the rear of the lower support frame (105) lower than the front of the lower support frame (105), and providing the lower support frame (105) with an incline towards the rear. This configuration lowers a restrained person's center of gravity with respect the legs of the person. A person attempting to move in the cart thereby encounters additional difficulty as any movement slides the person towards the rear of the safety restraint transport cart (100).

In general, the first rear tire (315) and the second rear tire (320) are fixed i.e., non-swiveling. The first rear tire (315) and the second rear tire (320), may be capable of swiveling to improve handling and steering, and still maintain the lower aspect of the lower support frame back rail (125) and rear of the safety restraint transport cart (100) with respect to the lower support frame front rail (120) and front of the lower support frame (105).

Also shown is FIG. 9 are portions of the safety restraint net and net support system (400), including parts of the safety restraint net (405), (previously discussed), a rear upper rail net affixment (470), (previously discussed), a safety restraint net arms and hands non-compression structure (475), and a safety restraint net back section (480).

The safety restraint net (405) may be made of fabric, plastic, fabric covered plastic, metal wires, coated wires or wires secured to padding to prevent injury, composite materials of these material, or of any material capable of providing secure and safe restraint, preferably with sufficient comfort for restrained person to prevent injury, and to reduce a likelihood of combativeness due to discomfort. The plastic may be ABS (Acrylonitrile Butadiene Styrene), Acetal (Polyoxymethylene, POM, Polycarbonate (PC), Polyvinyl Chloride (PVC), or other plastic with higher strength compared to other plastics.

These materials could be coated with fabric, plastic, or composite materials to aid comfort. These materials could be treated or coated to prevent liquid absorption, which increases the life span of the safety restraint net (405), mitigates the spread of injurious organisms, and increases the safety of the safety restraint transport cart (100) of the person accompanying the restrained person.

Though discussed previously, the safety restraint net arms and hands non-compression structure (475) allows a restrained person to place the person's wrists (which are typically restrained) into and through safety restraint net arms and hands non-compression structure (475). In doing so, the person's back is not pressing against the arms and hands of the person, thereby avoiding compression of arms and hands, which can cause injury. The safety restraint net arms and hands non-compression structure (475) also places the person's wrists in proximity to an at least one rear restraint structure (520), as discussed below.

Also shown in FIG. 9, around the safety restraint net arms and hands non-compression structure (475) is a safety restraint net back section (480). The safety restraint net back section (480) extends from the lower support frame (105) up to the rear upper rail net affixment (470), and between the first side rear frame support rail net affixment (450) and the second side rear frame support rail net affixment (455).

Also shown is FIG. 9 is a portion of the safety restraint system (500), specifically an at least one rear restraint structure (520), which may be used with wrist restraining devices to restrain a person to the cart and prevent the person from destabilizing the cart or escaping the cart.

FIG. 10 is a rear plan view of a safety restraint transport cart with a net and a restrained person. Shown in FIG. 10 are the safety restraint net arms and hands non-compression structure (475), (previously discussed), the safety restraint net back section (480), (previously discussed), the at least one rear restraint structure (520) (previously discussed) and a wrist restraint device (530). Note that for a clear view, several of the net affixments are omitted from the drawing.

As shown in FIG. 10, the safety restraint net arms and hands non-compression structure (475) allows a restrained person to place the person's wrists (which are typically restrained) into and through the safety restraint net arms and hands non-compression structure (475). In doing so, the person's back is not pressing against the arms and hands of the person, thereby avoiding compression of arms and hands, which can cause injury. The safety restraint net arms and hands non-compression structure (475) also places the person's wrists in proximity to an at least one rear restraint structure (520). In this configuration, an operator of the safety restraint transport cart (100) can secure the wrists of a restrained person to the at least one rear restraint structure (520) with a wrist restraint device (530).

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. It is realized that changes are possible within the scope of this invention and it is further intended that each structure or element recited in any of the claims is to be understood as referring to all equivalent structure or elements. The following claims are intended to cover the invention as broadly as possible in whatever form it may be used.

What is claimed is:

1. A safety restraint transport cart (100) for safely restraining and transporting people comprising
   a. a lower support frame (105) comprising a lower support frame first rail (110) coupled at a front end to a first side of a lower support frame front rail (120), which is coupled at a second side to a front end of a lower support frame second rail (115), which is coupled at a back end to left side of a lower support frame back rail (125), which is coupled at a right side to the lower support frame first rail (110),
   b. a first front tire (305) coupled to the lower support frame (105) above the first front tire (305) at an inside corner comprising the lower support frame front rail (120) and the lower support frame first rail (110),
   c. a second front tire (310) coupled to the lower support frame (105) above the second front tire (310) at an inside corner comprising the lower support frame front rail (120) and the lower support frame second rail (115),
   d. the lower support frame back rail (125) comprising an at least one rear axle (155) comprising a first rear tire (315) and a second rear tire (320), wherein
   e. when the safety restraint transport cart (100) rests on a level surface, the lower support frame front rail (120) rests at a higher height above the level surface with respect to the at least one rear axle (155),
   f. a front end of a first side upper rail (205) angularly coupled at about 30 degrees to the lower support frame first rail (110) adjacent to the lower support frame front rail (120) with the first side upper rail (205) projecting outward and backwards and coupled with an angularly coupled first side rear frame support rail (225) above the first rear tire (315), g. a front end of a second side upper rail (215) angularly coupled at about 30 degrees at to the lower support frame second rail (115) adjacent to the lower support frame front rail (120) with the second side upper rail (215) projecting angularly outward and backwards and coupled with an angularly coupled second side rear frame support rail (230) above a second rear tire (320), h. a bottom end of the angularly coupled first side rear frame support rail (225) angularly coupled to the lower support frame back rail (125) longitudinally inline and behind the first front tire (305) then angularly pitched outward and above the first rear tire (315), thence upwards with an angular pitch backwards of 5 to 25 degrees to a handle bar (355), i. a bottom end of the angularly coupled second side rear frame support rail (230) angularly coupled to the lower support frame back rail (125) longitudinally inline and behind the second front tire (310), then angularly pitched outward and above over the second rear tire (320), thence upwards with an angular pitch backwards of 5 to 25 degrees to the handle bar (355), j. a rear upper rail (255) horizontally coupled on a first side to the angularly coupled first side rear frame support rail (225) and horizontally coupled on a second side to the angularly coupled second side rear frame support rail (230) above and backwards of the first side upper rail (205) and the second side upper rail (215), k. a bottom end of an at least one handle bar support rail (345) coupled to the lower support frame back rail (125) between the first rear tire (315) and the angularly coupled first side rear frame support rail (225), l. a first side of the handle bar (355) coupled to a top end of the an at least one handle bar support rail (345) and to a top end of the angularly coupled first side rear frame support rail (225), m. a first side upper rail net affixment (410) to affix a safety restraint net (405) to the first side upper rail (205), n. an at least one lower support frame net affixment (420) to affix the safety restraint net (405) to the lower support frame first rail (110), o. a rear upper rail net affixment (470) to affix the safety restraint net (405) to the rear upper rail (255), and p. a first side rear frame support rail net affixment (450) to affix a safety restraint net back section (480) to the angularly coupled first side rear frame support rail (225).

2. The safety restraint transport cart (100) of claim 1 further comprising an at least one lower support frame mid-frame rail (130) coupled between the lower support frame first rail (110) and the lower support frame second rail (115).

3. The safety restraint transport cart (100) of claim 1 further comprising an at least one lower support frame rear wheel deflection frame (145) coupled to the lower support frame first rail (110) in front of first rear tire (315).

4. The safety restraint transport cart (100) of claim 1 wherein the an at least one handle bar support rail (345) further comprises a left rear axle frame pivot (160) coupled to the lower support frame first rail (110), and a handle bar second support rail (350) further comprises a right rear axle frame pivot (165) coupled to the lower support frame second rail (115), wherein left rear axle frame pivot (160) and the right rear axle frame pivot (165) are capable of rotation to reduce an angular separation of the lower support frame (105) with respect to the an at least one handle bar support rail (345) and the handle bar second support rail (350) from more than 90 degrees to less than 90 degrees.

5. The safety restraint transport cart (100) of claim 1 further comprising a left side upper rail lower support frame affixment (210) capable of pivoting the first side upper rail (205) with respect to the lower support frame (105).

6. The safety restraint transport cart (100) of claim 1 further comprising a right side upper rail lower support frame affixment (220) capable of pivoting the second side upper rail (215) with respect to the lower support frame (105).

7. The safety restraint transport cart (100) of claim 1 wherein the first side upper rail (205) comprises a left side upper rail rear affixment (235) capable of decoupling the first side upper rail (205) from the angularly coupled first side rear frame support rail (225).

8. The safety restraint transport cart (100) of claim 1 wherein the second side upper rail (215) comprises a right side upper rail rear affixment (240) capable of decoupling the second side upper rail (215) from the second side rear frame support rail (230).

9. The safety restraint transport cart (100) of claim 1 wherein the first front tire (305) and the second front tire (310) are capable of swiveling.

10. The safety restraint transport cart (100) of claim 1 wherein the first rear tire (315) and the second rear tire (320) are capable of swiveling.

11. The safety restraint net (405) of claim 1 further comprising a safety restraint net arms and hands non-compression structure (475) capable of providing a non-compressive space behind a restrained person within the safety restraint net (405).

12. The safety restraint transport cart (100) of claim 1 further comprising an at least one lap belt (505) affixed to the lower support frame net bottom section (485) for securing and restraining a person within the safety restraint transport cart and net (100).

13. The safety restraint transport cart (100) of claim 1 further comprising an least one shoulder belt (510) affixed to the rear upper rail net affixment (470) for securing and restraining a person within the safety restraint transport cart and net (100).

14. The safety restraint transport cart (100) of claim 1 further comprising an at least one front bumper support rail (175) coupling the lower support frame (105) to a front bumper (170).

15. The safety restraint transport cart (100) of claim 1 wherein the safety restraint net (405) comprises a tapered front end (490) having a smaller width at a front bumper (170) of the lower support frame (105) than at lower support frame back rail (125).

16. The safety restraint transport cart (100) of claim 1 further comprising an at least one front restraint structure (515) affixed to the lower support frame (105) for restraining a person to the safety restraint transport cart and net (100).

17. The safety restraint transport cart (100) of claim 1 further comprising an at least one rear restraint structure (520) affixed to the lower support frame back rail (125) for restraining a person to the safety restraint transport cart and net (100).

18. The safety restraint transport cart (100) of claim 1 wherein the wherein the safety restraint net (405) further comprises a safety restraint net left section (460) and a safety restraint net right section (465) and the safety restraint transport cart (100) further comprises an at least one leg restraint structure (525) affixed between the safety restraint net left section (460) and safety restraint net right section (465) for restraining a person to the safety restraint transport cart and net (100).

19. The safety restraint transport cart (100) of claim 1 further comprising a left rear mid-level support rail (245) coupling the angularly coupled first side rear frame support rail (225) to the an at least one handle bar support rail (345).

20. The safety restraint transport cart (100) of claim 1 further comprising a first rear tire brake rail (325) above the first rear tire (315) and below a left rear mid-level support rail (245) and coupling the angularly coupled first side rear frame support rail (225) to the an at least one handle bar support rail (345) and comprising an at least one rear tire brake (335).

\* \* \* \* \*